United States Patent
Lee et al.

(10) Patent No.: US 9,011,987 B2
(45) Date of Patent: Apr. 21, 2015

(54) LIQUID CRYSTAL DISPLAY

(75) Inventors: Jun Hyup Lee, Seoul (KR); Sang Gyun Kim, Asan-si (KR); Jang-Hyun Kim, Hwaseong-si (KR); Tae Hoon Kim, Suwon-si (KR); Seung Wook Nam, Cheonan-si (KR); Keun Chan Oh, Cheonan-si (KR); Taek Joon Lee, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 58 days.

(21) Appl. No.: 13/554,226

(22) Filed: Jul. 20, 2012

(65) Prior Publication Data

US 2013/0194525 A1      Aug. 1, 2013

(30) Foreign Application Priority Data

Feb. 1, 2012   (KR) .................. 10-2012-0010375

(51) Int. Cl.
| | | |
|---|---|---|
| C09K 19/00 | (2006.01) | |
| G02F 1/1337 | (2006.01) | |
| G02F 1/1362 | (2006.01) | |
| G02F 1/1343 | (2006.01) | |

(52) U.S. Cl.
CPC .... *G02F 1/133711* (2013.01); *G02F 1/136286* (2013.01); *G02F 2001/134381* (2013.01); *G02F 2201/50* (2013.01); *Y10S 430/114* (2013.01)

(58) Field of Classification Search
CPC ................. G02F 1/1337; G02F 1/1333; G02F 1/133711; G02F 1/133788; G02F 1/133345; G02F 7/0042; G02F 7/0005; G02F 2001/1337; G02F 2001/133711; G02F 2001/133765; G02F 2202/022; G02F 2202/023

USPC .......... 428/1.1, 1.2, 1.23; 349/123, 128, 131; 430/281.1, 286.1, 287.1, 321, 270.1, 430/913, 916; 526/279

See application file for complete search history.

(56) References Cited

U.S. PATENT DOCUMENTS

| | | | |
|---|---|---|---|
| 7,450,207 B2 | 11/2008 | Shimoshikiryo | |
| 7,486,366 B2 | 2/2009 | Kataoka et al. | |
| 2008/0308301 A1* | 12/2008 | Itoh et al. | 174/250 |
| 2009/0176337 A1* | 7/2009 | Kang et al. | 438/151 |
| 2010/0134710 A1 | 6/2010 | Ishitani et al. | |
| 2010/0182556 A1 | 7/2010 | Oh et al. | |
| 2010/0266821 A1* | 10/2010 | Bury et al. | 428/195.1 |
| 2011/0032465 A1 | 2/2011 | Seong et al. | |
| 2011/0051059 A1 | 3/2011 | Kang et al. | |

FOREIGN PATENT DOCUMENTS

| | | |
|---|---|---|
| JP | 3877129 | 11/2006 |
| KR | 1020100103091 A | 9/2010 |
| KR | 1020110021587 A | 3/2011 |
| KR | 1020110024509 A | 3/2011 |

* cited by examiner

*Primary Examiner* — Gwendolyn Blackwell
*Assistant Examiner* — Ruiyun Zhang
(74) *Attorney, Agent, or Firm* — Cantor Colburn LLP (57) ABSTRACT

A liquid crystal display including a first substrate; a second substrate facing the first substrate; a thin film transistor disposed on the first substrate; an organic layer disposed on the thin film transistor; a pixel electrode disposed on the organic layer; a lower alignment layer disposed on the pixel electrode; a common electrode disposed on the second substrate; and an upper alignment layer disposed on the common electrode, wherein a first free radical included in the organic layer and a second free radical included in at least one of the lower alignment layer and the upper alignment layer are radical bonded.

19 Claims, 5 Drawing Sheets

LIQUID CRYSTAL DISPLAY

CROSS-REFERENCE TO RELATED APPLICATION

This application claims priority to Korean Patent Application No. 10-2012-0010375, filed on Feb. 1, 2012, and all the benefits accruing therefrom under 35 U.S.C. §119, the content of which in its entirety is herein incorporated by reference.

BACKGROUND OF THE INVENTION (a) Field of the Invention

The disclosure relates to a liquid crystal display.

(b) Description of the Related Art

A liquid crystal display is one of the most widely used flat panel display device. The liquid crystal display includes two display panels each including an electric field generating electrode, such as a pixel electrode, and a common electrode, and a liquid crystal layer interposed between the two display panels.

In the liquid crystal display, a voltage is applied to the electric field generating electrodes to generate an electric field in a liquid crystal layer. Due to the generated electric field, liquid crystal molecules of the liquid crystal layer are aligned and a polarization of incident light is controlled, thereby displaying an image.

The liquid crystal display can have a greenish color. It would be desirable to have a liquid crystal display without the greenish color.

SUMMARY

In an embodiment a liquid crystal display in which a greenish defect is substantially or effectively reduced or prevented is provided.

A liquid crystal display according to an exemplary embodiment includes: a first substrate; a second substrate facing the first substrate; a thin film transistor disposed on the first substrate; an organic layer disposed on the thin film transistor; a pixel electrode disposed on the organic layer; a lower alignment layer disposed on the pixel electrode; a common electrode disposed on the second substrate; and an upper alignment layer disposed on the common electrode, wherein a first free radical included in the organic layer and a second free radical included in at least one of the lower alignment layer and the upper alignment layer are radical bonded.

The lower alignment layer and the upper alignment layer may each further include a functional group represented by Chemical Formula 1

Chemical Formula 1 wherein, m is 1-5.

The lower alignment layer and the upper alignment layer may each further include a vinyl functional group.

The lower alignment layer and the upper alignment layer may each further include a methacrylate functional group.

The organic layer may have negative photosensitivity.

The pixel electrode may include a first subpixel electrode and a second subpixel electrode, wherein the first subpixel electrode and the second subpixel electrode may each include a cross stem including a transverse stem and a longitudinal stem intersecting the transverse stem and a plurality of branches extending from the cross stem.

A gate line and a reference voltage line disposed on the first substrate and a data line intersecting the gate line may be further included in the liquid crystal display.

The thin film transistor may include a first thin film transistor and a second thin film transistor each connected to the gate line and the data line, and a third thin film transistor connected to the gate line, a terminal of the second thin film transistor, and the reference voltage line.

The pixel electrode may include a first subpixel electrode and a second subpixel electrode separated from each other, wherein the first subpixel electrode may be electrically connected to the first thin film transistor, and the second subpixel electrode may be electrically connected to the second thin film transistor.

An assistance voltage line electrically connected to the reference voltage line through the third thin film transistor and disposed on the data line may be further included, and the assistance voltage line may be disposed on a same layer as the pixel electrode.

The reference voltage line may include a protrusion overlapping one terminal of the third thin film transistor, and the assistance voltage line may include a connecting member extending toward the protrusion of the reference voltage line.

An output terminal of the second thin film transistor may be connected to the second subpixel electrode and an input terminal of the third thin film transistor.

Each control terminal of the first thin film transistor, the second thin film transistor, and the third thin film transistor may be configured to simultaneously respond to a gate signal.

A gate line and a step-down gate line disposed on the first substrate, and a data line intersecting the gate line, may be further included in the liquid crystal display.

The thin film transistor may include a first thin film transistor and a second thin film transistor each connected to the gate line and the data line, and a third thin film transistor connected to the step-down gate line.

The pixel electrode may include a first subpixel electrode and a second subpixel electrode separated from each other, wherein the first subpixel electrode may be electrically connected to the first thin film transistor, and the second subpixel electrode may be electrically connected to the second thin film transistor.

A storage electrode overlapping a terminal of the third thin film transistor may be further included in the liquid crystal display.

Also disclosed is a method of manufacturing a liquid crystal display, the method including: disposing a first substrate, a second substrate facing the first substrate, a thin film transistor disposed on the first substrate, an organic layer disposed on the thin film transistor, a pixel electrode disposed on the organic layer, a lower alignment layer disposed on the pixel electrode, a common electrode disposed on the second substrate, and an upper alignment layer disposed on the common electrode; and contacting at least one of a first free radical included in the organic layer and a second free radical included in at least one of the lower alignment layer and the upper alignment layer to form a product of the first free radical and the second free radical disposed on at least one of the lower alignment layer and the upper alignment layer, to manufacture the liquid crystal display.

As is further described, according to an exemplary embodiment, the second free radicals included in the lower and upper alignment layers may react with the first free radical of the passivation layer of the organic layer having negative photosensitivity such that a greenish defect emitting light of the visible light region may be improved.

BRIEF DESCRIPTION OF THE DRAWINGS

The above and other features and advantages of this disclosure will become more apparent by describing in detail embodiments thereof, with reference to the accompanying drawings, in which.

DETAILED DESCRIPTION

The embodiments are described more fully hereinafter, with reference to the accompanying drawings, in which exemplary embodiments of the invention are shown. This disclosure may, however, be embodied in many different forms and should not be construed as limited to the disclosed embodiments set forth herein, but, on the contrary, is intended to cover various modifications. Thus these embodiments are provided so that this disclosure will be thorough and complete, and will fully convey the scope of the disclosure to those skilled in the art. The disclosed embodiments may be modified in various different ways, all without departing from the spirit or scope of the present disclosure.

In the drawings, the thickness, size, and relative sizes of layers, films, panels, regions, etc., may be exaggerated for clarity. It will be understood that when an element such as a layer, film, region, or substrate is referred to as being "on", "connected to", or "coupled to" another element or layer, it can be directly on, connected to, or coupled to the other element or intervening elements or layers may be present. When an element or layer is referred to as being "disposed on" or "formed on" another element or layer, the elements or layers are understood to be in at least partial contact with each other, unless otherwise specified. In contrast, when an element or layer is referred to as being "directly on", "directly connected to", or "directly coupled to" another element or layer, the elements are in at least partial contact with each other and there are no intervening elements or layers present. Like reference numerals refer to like elements throughout.

The terminology used herein is for the purpose of describing particular embodiments only and is not intended to be limiting. As used here, the singular forms "a," "an," and "the" are intended to include the plural forms as well, unless the content clearly indicates otherwise. "Or" includes "and/or." As used herein, the term "and/or" includes any and all combinations of one or more of the associated listed items. It will be further understood that the terms "comprises" and/or "comprising," or "includes" and/or "including" when used in this specification specify the presence of stated features, regions, integers, steps, operations, elements, and/or components but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning consistent with their meaning in the context of the relevant art, and will not be interpreted in an idealized or overly formal sense unless expressly so defined herein.

Embodiments are described herein with reference to cross sectional illustrations that are schematic illustrations of idealized embodiments (and intermediate structures). As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. A region illustrated as a rectangle may typically have rounded or curved features. Moreover, sharp angles that are illustrated may be rounded. Likewise, a buried region formed by implantation may result in some implantation in the region between the buried region and the surface through which the implantation takes place. Thus, the regions illustrated in the figures are schematic in nature and their shapes are not intended to illustrate the precise shape of a region and are not intended to limit the scope of the present disclosure.

It will be understood that, although the terms "first", "second", "third", and the like do not imply any particular order, but may be used herein to describe various elements, components, regions, layers and/or sections. These elements, components, regions, layers and/or sections should not be limited by these terms. These terms are only used to distinguish one element, component, region, layer and/or section. Thus a first element, component, region, layer and/or section discussed below could be termed a second element, component, region, layer and/or section without departing from the teachings herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the apparatus in use or operation in addition to the orientation depicted in the figures. For example, if the apparatus in the figures is turned over, elements described as "beneath", "below", or "lower" other elements or features would then be oriented "above", or "upper" the other elements or features. Thus, the exemplary term "below" can encompass both an orientation above and below. The apparatus may be otherwise oriented (rotated 90 degrees or at other orientations) and the spatially relative descriptors used herein interpreted accordingly.

As used herein, the term "alkyl" means a straight or branched chain saturated aliphatic hydrocarbon having the specified number of carbon atoms and having a valence of at least one, optionally substituted with one or more substituents where indicated, provided the valence of the alkyl group is not exceeded.

According to an embodiment, the liquid crystal display includes a lower display panel, e.g. first substrate and an upper display panel, e.g. second substrate facing each other. The lower display panel may include a gate line which transmits a gate signal and a data line which transmits a data signal, wherein the gate line and the data line may intersect each other, a thin film transistor electrically connected to the gate line and the data line, and a pixel electrode electrically connected to the thin film transistor. The upper display panel may include a light blocking member, a color filter, and a common electrode.

The liquid crystal display may further include an organic layer having negative photosensitivity. While not wishing to be bound by theory, it is believed the organic layer facilitates high transmittance and a fast response speed. The liquid crystal display may further include a pixel electrode having a slit pattern. The liquid crystal display may further include a lower alignment layer and an upper alignment layer, each of which may include a reactive mesogen.

According to an embodiment, at an interface of the organic layer and at least one of the lower alignment layer and the upper alignment layer, a first free radical can react with a second free radical to form a product disposed on at least one of the lower alignment layer and the upper alignment layer. The product can include a double bond, and can be highly conjugated, thereby generating visible light, which can be greenish in color.

A liquid crystal display according to an exemplary embodiment will be further described with reference to FIG. 1 to FIG. 3.

Figure 1:
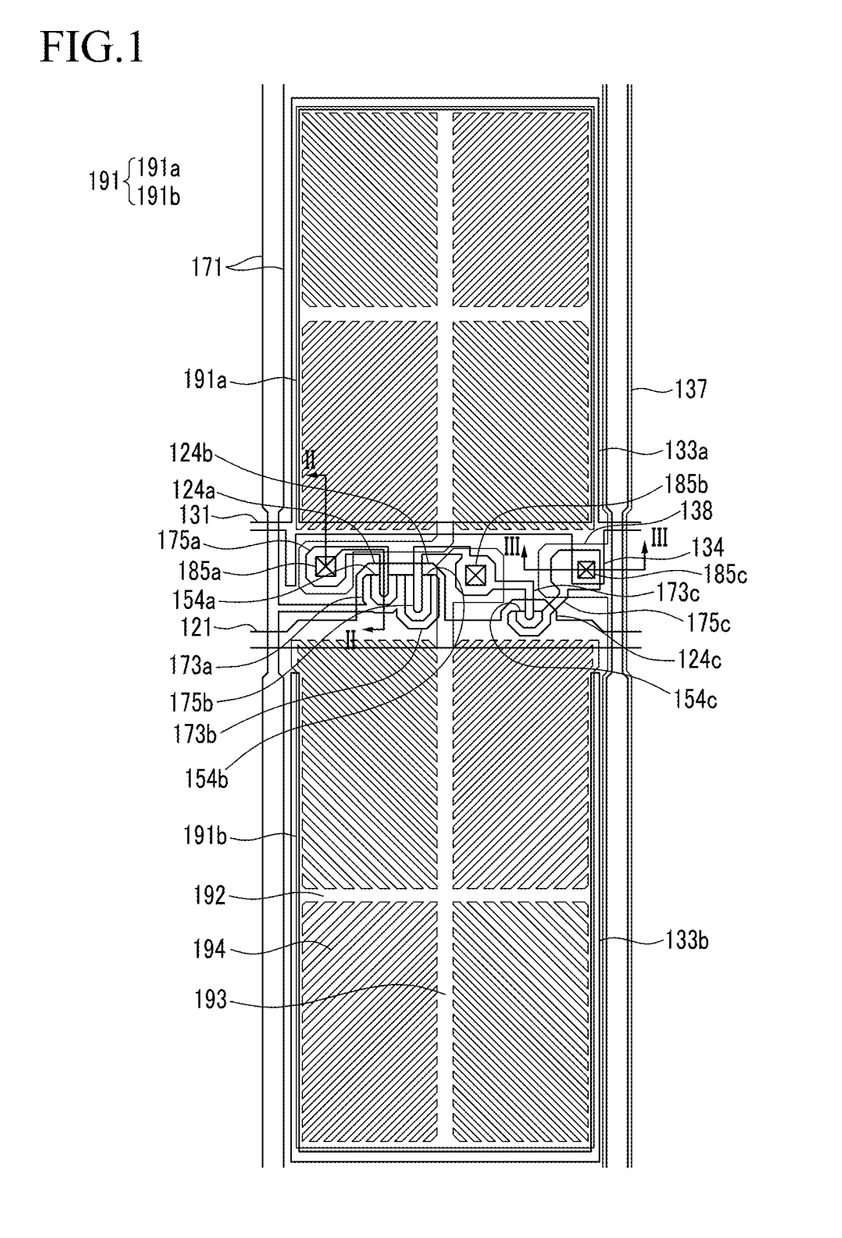
FIG. 1 is a plan view of a liquid crystal display according to an exemplary embodiment.
Figure 2:
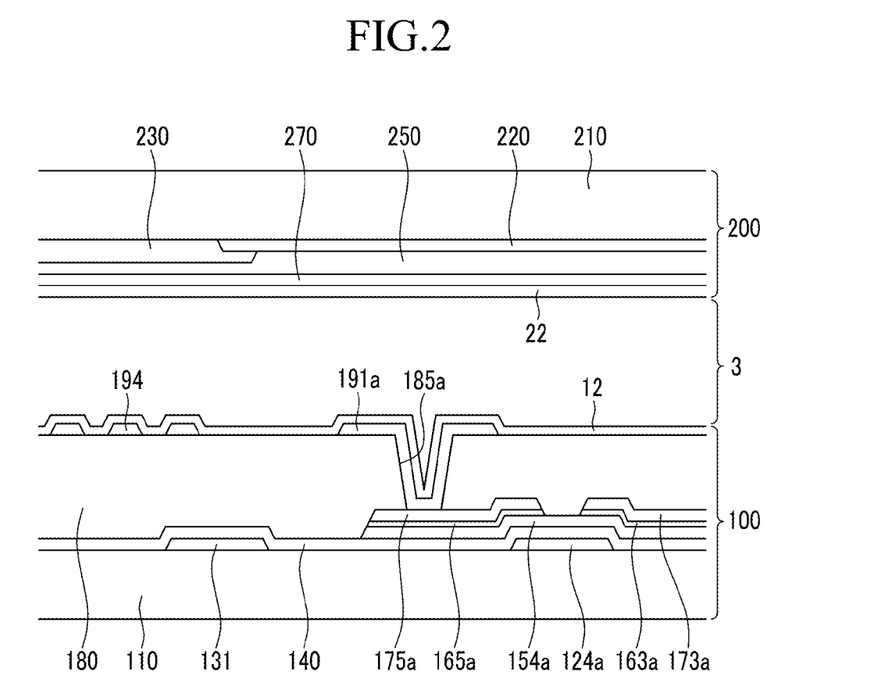
FIG. 2 is a cross-sectional view taken along line II-II of FIG. 1.
Figure 3:
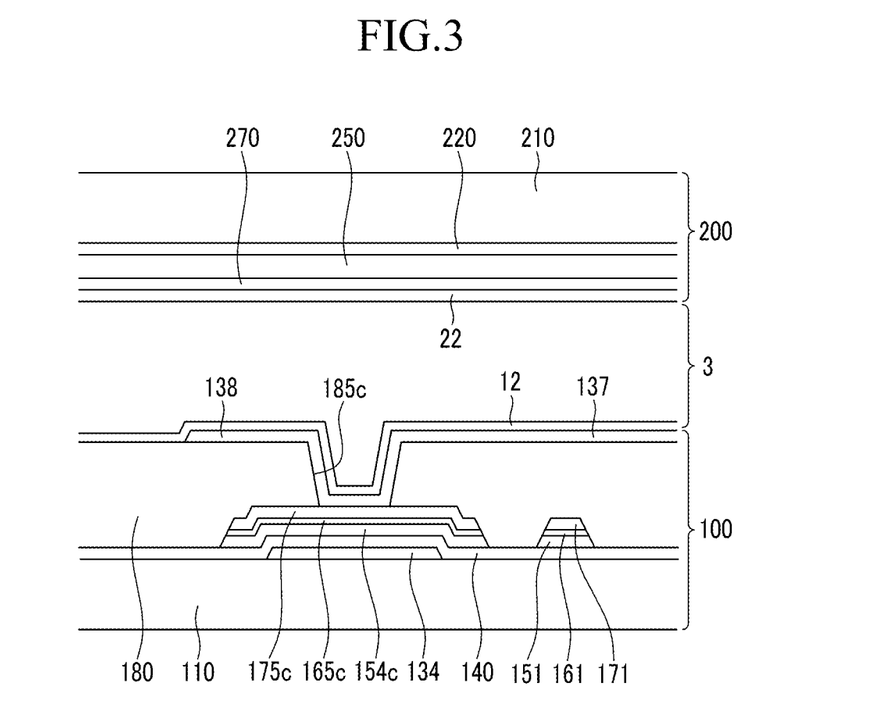
FIG. 3 is a cross-sectional view taken along line III-III of FIG. 1.

FIG. 1 is a plan view of a liquid crystal display according to an exemplary embodiment, FIG. 2 is a cross-sectional view taken along line III-III of FIG. 1, and FIG. 3 is a cross-sectional view taken along line III-III of FIG. 1.

Referring to FIG. 1 to FIG. 3, a liquid crystal display according to an exemplary embodiment includes a lower display panel 100 e.g., first substrate and an upper display panel 200, e.g., second substrate, facing each other, and a liquid crystal layer 3 interposed between the two display panels 100 and 200.

According to an embodiment, a liquid crystal display includes a first substrate; a second substrate facing the first substrate; a thin film transistor disposed on the first substrate; an organic layer disposed on the thin film transistor; a pixel electrode disposed on the organic layer; a lower alignment layer disposed on the pixel electrode; a common electrode disposed on the second substrate; and an upper alignment layer disposed on the common electrode, wherein a product of a first free radical included in the organic layer and a second free radical included in at least one of the lower alignment layer and the upper alignment layer is disposed on at least one of the lower alignment layer and the upper alignment layer.

First, the lower display panel 100, e.g. first substrate, will be described referring to FIG. 1 to FIG. 3.

A gate line 121 and a reference voltage line 131 are each disposed on an insulation substrate 110, wherein the insulation substrate includes a transparent glass or a plastic.

According to an embodiment, the gate line and the reference voltage line may be disposed on the lower display panel, e.g. first substrate, and a data line may intersect the gate line.

The gate line 121, extending in a mainly transverse direction, is configured to transmit a gate signal, and includes a first gate electrode 124a, a second gate electrode 124b, and a third gate electrode 124c.

The reference voltage line 131, extending in a mainly transverse direction, is configured to transmit a predetermined voltage, such as a reference voltage, and includes a first reference electrode 133a enclosing a first pixel electrode 191a, which will be further described later, and a protrusion 134 protruding in a direction of the gate line 121. The reference voltage line 131, further includes a second reference electrode 133b enclosing a second pixel electrode 191b which will be further described later. Although not shown in FIG. 1, a horizontal portion of the first reference electrode 133a is electrically connected to a horizontal portion of the second reference electrode 133b of a previous pixel by integral wiring. A gate insulating layer 140 is disposed on the gate line 121 and the reference voltage line 131.

A plurality of semiconductor stripes 151, wherein each semiconductor stripe includes a hydrogenated amorphous silicon (a-Si), polysilicon, or the like, are disposed on the gate insulating layer 140. The semiconductor stripes 151 extend in a mainly vertical direction, and each semiconductor stripe 151 includes a first semiconductor 154a, a second semiconductor 154b, and a third semiconductor 154c.

A plurality of ohmic contact stripes 161 are disposed on the semiconductor stripes 151. A plurality of ohmic contacts including ohmic contacts 163a, 165a, and 165c, are disposed on the first semiconductor 154a, the second semiconductor 154b, and the third semiconductor 154c, wherein ohmic contacts 163a and 165a are only shown disposed on the first semiconductor 154a in FIG. 2, and an ohmic contact 165c is only shown disposed on the third semiconductor 154c in FIG. 3 because the cutting lines of the drawing do not transverse the other portion.

Data conductors 171, 173c, 175a, 175b, and 175c, include a plurality of data lines 171, including a first source electrode 173a, a second source electrode 173b, a first drain electrode 175a, a second drain electrode 175b, a third source electrode 173c, and a third drain electrode 175c. The data conductors are disposed on the ohmic contacts 163a, 165a, and 165c and the gate insulating layer 140. The third drain electrode 175c overlaps the protrusion 134 of the reference voltage line 131.

The first gate electrode 124a, the first source electrode 173a, and the first drain electrode 175a form a first thin film transistor Qa along with the first semiconductor 154a, and a channel of the thin film transistor is formed in the semiconductor portion 154a between the first source electrode 173a and the first drain electrode 175a.

Similarly, the second gate electrode 124b, the second source electrode 173b, and the second drain electrode 175b form a second thin film transistor Qb along with the second semiconductor 154b, and the channel of the thin film transistor is formed in the semiconductor portion 154b between the second source electrode 173b and the second drain electrode 175b, and the third gate electrode 124c, the third source electrode 173c, and the third drain electrode 175c form a third thin film transistor Qc along with the third semiconductor 154c, and the channel of the thin film transistor is formed in the semiconductor portion 154c between the third source electrode 173c and the third drain electrode 175c.

According to an embodiment, a thin film transistor may include a first thin film transistor and a second thin film transistor each electrically connected to the gate line and the data line, and a third film transistor electrically connected to the gate line, a terminal of the second thin film transistor, and the reference voltage line.

A passivation layer 180 is disposed on the data conductors 171, 173c, 175a, 175b, and 175c, and the exposed semiconductors 154a, 154b, and 154c. The passivation layer 180 may include an organic layer and may have a flat surface. The organic layer has negative photosensitivity and a dielectric constant thereof may be less than about 4.0, specifically about 3.0 or less, more specifically about 2.0 or less. The passivation layer 180 can have a dual-layered structure including a lower inorganic layer and an upper organic layer disposed on the exposed region of the semiconductor 154 in order to sustain the inorganic layer's excellent insulating characteristics, and to avoid damage to the exposed region of the semiconductors 154a, 154b, and 154c.

The passivation layer 180 includes a first contact hole 185a, a second contact hole 185b, and a third contact hole 185c respectively exposing the first drain electrode 175a, the second drain electrode 175b, and the third drain electrode 175c.

A pixel electrode 191 including a first subpixel electrode 191a, and a second subpixel electrode 191b, and an assistance storage voltage line 137, are disposed on the passivation layer 180. The pixel electrode 191 and the assistance storage voltage line 137 may each include a transparent conductive material, such as indium tin oxide ("ITO") or indium zinc oxide ("IZO"), or a reflective metal such as aluminum, silver, chromium, or alloys thereof.

According to an embodiment, the pixel electrode, may include a first subpixel electrode, and a second subpixel electrode separated from each other, wherein the first subpixel electrode may be electrically connected to the first thin film transistor, and the second subpixel electrode may be electrically connected to the second thin film transistor. An output terminal of the second thin film transistor may be electrically connected to the second subpixel electrode and an input terminal of the third thin film transistor, according to an embodiment.

According to an embodiment, the assistance storage voltage line may be electrically connected to the reference voltage line through the third thin film transistor and disposed on the data line and the organic layer.

The first subpixel electrode 191a and the second subpixel electrode 191b neighbor each other in a column direction, and the overall shape thereof is quadrangular. The first subpixel and the second subpixel each includes a cross stem including a transverse stem 192 and a longitudinal stem 193 intersecting the transverse stem. The first and second subpixel electrodes 191a and 191b, are divided into four sub-regions by the transverse stem 192 and the longitudinal stem 193, and each of the sub-regions includes a plurality of minute branches 194. According to an embodiment, a plurality of minute branches may extend from the cross stem.

A first portion of the minute branches 194 of the first subpixel electrode 191a and the second subpixel electrode 191b are obliquely extended in a left upper direction from the transverse stem 192 or the longitudinal stem 193, and a second portion of the minute branches 194 are obliquely extended in a right upper direction from the transverse stem 192 or the longitudinal stem 193. A third portion of the minute branches 194 are obliquely extended in a left lower direction from the transverse stem 192 or the longitudinal stem 193, and a forth portion of the minute branches 194 are obliquely extended in a right lower direction from the transverse stem 192 or the longitudinal stem 193.

Each of the minute branches 194 forms an angle of about 40 degrees to about 45 degrees with the gate line 121 or the transverse stem 192. The minute branches 194 included in the first subpixel electrode 191a may form an angle of about 40 degrees with the transverse stem 192, and the minute branches 194 included in the second subpixel electrode 191b may form an angle of about 45 degrees with the transverse stem 192. Also, the minute branches 194 of two neighboring sub-regions may be crossed.

The width of the minute branches 194 may be about 3 micrometers (μm) to about 8 μm, specifically about 4 μm to about 7 μm, more specifically about 5 μm to 6 μm. Although not shown, the width of the minute branches 194 may be gradually widened.

The first subpixel electrode 191a and the second subpixel electrode 191b are physically and electrically connected to the first drain electrode 175a and the second drain electrode 175b through the contact holes 185a and 185b, respectively, and receive the data voltage from the first drain electrode 175a and the second drain electrode 175b. According to an embodiment, a part of the data voltage applied to the second drain electrode 175b is divided through the third source electrode 173c, such that the magnitude of the voltage applied to the second subpixel electrode 191b may be smaller than that of the voltage applied to the first subpixel electrode 191a. Accordingly, the voltage applied to the first subpixel electrode 191a and the second subpixel electrode 191b is positive, and in contrast, in an embodiment wherein the voltage applied to the first subpixel electrode 191a and the second subpixel electrode 191b is negative, the voltage applied to the first subpixel electrode 191a is smaller than the voltage applied to the second subpixel electrode 191b.

An area of the second subpixel electrode 191b may be approximately one to two times less than that of the first subpixel electrode 191a.

The assistance storage voltage line 137 is positioned at a portion corresponding to each data line 171, and includes a connecting member 138 extending toward the protrusion 134 of the main storage electrode line 131. The connecting member 138 is connected to the third drain electrode 175c through the third contact hole 185c. The protrusion 134 of the reference voltage line 131 is applied with a reference voltage ("Vcst") such that the reference voltage ("Vcst") has a constant voltage and is applied to the third thin film transistor through the third drain electrode 175c. As a result, the voltage applied to the second subpixel electrode 191b is decreased.

According to an embodiment, the reference voltage line may include a protrusion overlapping one terminal of the third thin film transistor, and the assistance voltage line may include a connecting member extending toward the protrusion of the reference voltage line.

A lower alignment layer 12 is disposed on the pixel electrode 191.

Next, the upper display panel, e.g. second substrate 200 will be described, referring to FIG. 1 to FIG. 3.

A light blocking member 220 is disposed on an insulation substrate 210, wherein the insulation substrate includes a transparent glass or a plastic. The light blocking member 220, e.g., a black matrix, reduces or prevents light leakage.

A plurality of color filters 230 are disposed on the substrate 210 and the light blocking member 220. A portion of the color filters 230 are disposed in a region enclosed by the light blocking member 220, and may extend in a direction of a column of the pixel electrode 191. Each color filter 230 may display one of three primary colors such as red, green, or blue. However, the color filter is not limited to the three primary colors red, green, and blue, and may display cyan, magenta, yellow, or a white-based color.

At least one of the light blocking member 220 and the color filter 230 may be disposed on the lower substrate 110.

An overcoat 250 is disposed on the color filter 230 and the light blocking member 220. The overcoat 250 may include an insulating material, which reduces or prevents the color filter 230 from being exposed, and may further include a flat surface. The overcoat 250 may be omitted.

A common electrode 270 is disposed on the overcoat 250.

An upper alignment layer 22 is disposed on the common electrode 270.

Two polarizers (not shown) are disposed on the outer surface of the display panels 100 and 200, a polarization axis of the two polarizers are crossed, and a polarization axis thereof may be parallel to the gate lines 121. According to an embodiment, a reflective liquid crystal display includes a configuration wherein one of the two polarizers may be omitted.

According to an embodiment, when a data voltage is applied to the first subpixel electrode 191a and the second subpixel electrode 191b, the first subpixel electrode 191a and the second subpixel electrode 191b generate an electric field, together with the common electrode 270 of the upper display panel 200, which receives a common voltage. The electric field determines a direction of the liquid crystal molecules of the liquid crystal layer 3 between the two electrodes 191a and 191b, and the common electrode 270. Polarization of light which transmits through the liquid crystal layer 3 differs depending on the direction of the liquid crystal molecules.

According to an embodiment, the first and second subpixel electrodes 191a and 191b respectively, and the common electrode 270, form liquid crystal capacitors, to maintain the applied voltage after the thin film transistor is turned off. An edge of a minute branch 194 forms a horizontal component perpendicular to an edge of a minute branch 194, and an inclination direction of liquid crystal molecules is determined in a direction determined by the horizontal component. According to an embodiment, the liquid crystal molecules initially tend to incline in a direction perpendicular to an edge of a minute branch 194. However, a direction, of the horizontal components of the electric field by an edge of the neighboring minute branch 194 are opposite, and an interval between the minute branch 194 is narrow such that the liquid crystal molecules that tend to incline in an opposite direction to each other are tilted in a direction parallel to a length direction of a minute branch 194.

According to an embodiment, the length directions in which the minute branches 194 of one pixel extend are four directions, such that the inclined directions of the liquid crystal molecules are four directions. Therefore, a viewing angle of the liquid crystal display is widened by varying the inclined directions of the liquid crystal molecules.

The lower and upper alignment layers 12 and 22 according to an exemplary embodiment include a compound represented by Chemical Formula A below.

Chemical Formula A

In Chemical Formula A, Y1 is a functional group which may facilitate a reaction of a photoinitiator and a free radical and may be a thiol group represented by Chemical Formula 1 below.

Chemical Formula 1

In Chemical Formula 1, m is 1-5.

Y2 is a functional group which may have a bridge function in a radical reaction, and may be a vinyl group represented by Chemical Formula 2 below.

Chemical Formula 2

Y3 is a functional group which may have a monomer which functions to form a pre-tilt of liquid crystal molecules of the liquid crystal layer and a radical reaction, and may be a methacrylate group represented by Chemical Formula 3 below.

Chemical Formula 3

X is a functional group, which may facilitate aligning liquid crystal molecules of the liquid crystal layer 3, and may be an alkoxide group represented by Chemical Formula 4 below.

Chemical Formula 4

In Chemical Formula 4, n is 1 to 5.

M is a functional group which may improve phase separation and may be a methyl group.

R is a functional group which may enhance reliability and/or a physical property of an upper and/or lower alignment layer, and may be a hydroxyl group.

According to an embodiment, the lower and upper alignment layers each include a compound represented by Chemical Formula A, wherein Y1 is a functional group represented by Chemical Formula 1, Y2 is a functional group represented by Chemical Formula 2, Y3 is a functional group represented by Chemical Formula 3, X is a functional group represented by Chemical Formula 4, M is a methyl group, and R is a hydroxyl group.

According to an embodiment, the lower alignment layer and upper alignment layer may each further comprise a functional group represented by Chemical Formula 1. According to an embodiment, the lower alignment layer and upper alignment layer may each further comprise a vinyl functional group. The vinyl functional group may be a vinyl group represented by Chemical Formula 2. According to an embodiment, the lower alignment layer and upper alignment layer may each further comprise a methacrylate functional group.

The methacrylate functional group may be a methacrylate group represented by Chemical Formula 3.

According to an embodiment, the functional group Y1, represented by Chemical Formula 1, may accelerate a radical reaction of the methacrylate group and the vinyl group. This radical reaction increases the reaction along with a radical residue, wherein the passivation layer 180 includes the organic layer having negative photosensitivity, wherein the passivation layer includes the radical residue. While not wishing to be bound by theory, it is believed a greenish defect of the organic layer, emitting light of a visible light region, may thus be improved.

Next, the greenish defect will be further described.

According to an embodiment, to increase sensitivity, the organic layer having the negative photosensitivity may include a photoinitiator represented by Chemical Formula 5 below.

Chemical Formula 5

The photoinitiator represented by Chemical Formula 5 is dissolved in a photolithography process to form a residue represented by Chemical Formula 6 below.

Chemical Formula 6

According to an embodiment, if ultraviolet rays are irradiated to the residue represented by Chemical Formula 6 in the following process, first free radicals represented by Chemical Formula 7 and Chemical Formula 8 are formed.

Chemical Formula 7

Chemical Formula 8

If the first free radicals represented by Chemical Formula 7 and Chemical Formula 8 are combined with each other, a compound including a highly conjugated double bond is formed such that visible light of the visible light region is emitted, thereby generating a greenish defect.

According to an embodiment, a method of improving the greenish defect of the alignment layer of the present exemplary embodiment is improved as follows.

Firstly, when ultraviolet rays are irradiated on to the alignment layer represented by Chemical Formula B, a radical represented by Chemical Formula 9 below is formed.

Chemical Formula B

In Chemical Formula B, Y is —S—H, Z is [—O—]$_n$, wherein n is 0 or 1.

Chemical Formula 9

In Chemical Formula 9, Y is —S., e.g. a thiyl free radical, and Z is [—O—]$_n$ wherein n is 0 or 1.

The second free radical represented by Chemical Formula 9 included in at least one of the lower alignment layer and the upper alignment layer effectively or substantially removes the first free radical represented by Chemical Formula 7 and the first free radical represented by Chemical Formula 8, thereby reducing or preventing the formation of a compound including a double bond formed from a reaction of the first free radicals represented by Chemical Formula 7 and Chemical Formula 8. Accordingly, the greenish defect, due to the conjugated double bond of the compound formed from a reaction of the first free radicals represented by Chemical Formula 7 and Chemical Formula 8, may be reduced or prevented.

According to an embodiment, at least one of the lower alignment layer and the upper alignment layer may include a second free radical. The second free radical may be represented by Chemical Formula 9. At least one of the lower alignment layer and the upper alignment layer may further include a compound represented by Chemical Formula B, wherein the compound may include the second free radical.

As described above, according to an embodiment, the second free radical included in at least one of the lower alignment layer and upper alignment layer may react with at least one of the first free radical included in the organic layer having negative photosensitivity. Accordingly, a greenish defect emitting light of the visible light region may be improved.

Next, a liquid crystal display according to another exemplary embodiment will be described with reference to FIG. 4 and FIG. 5.

Figure 4:
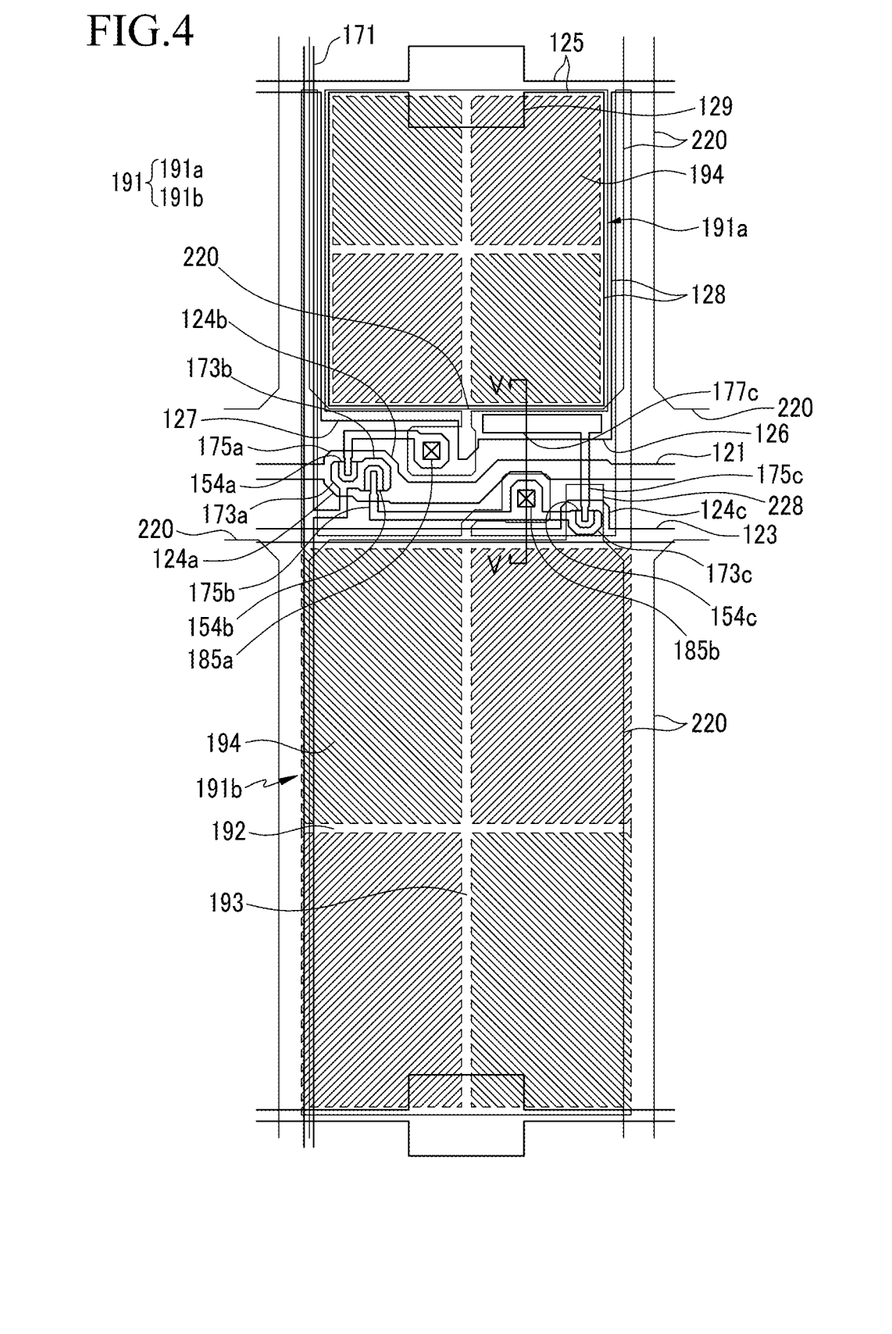
FIG. 4 is a plan view of a liquid crystal display according to another exemplary embodiment.
Figure 5:
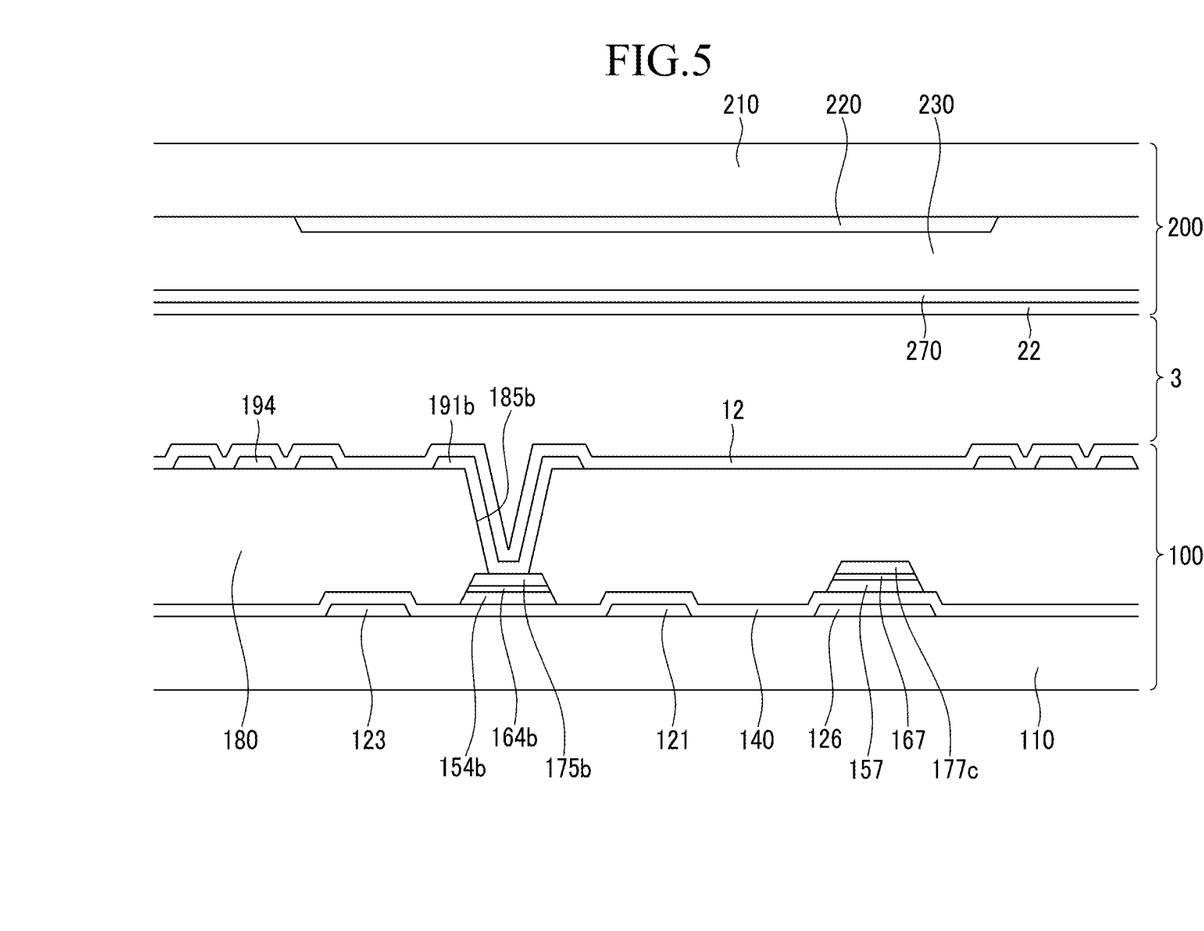
FIG. 5 is a cross-sectional view taken along line V-V of FIG. 4.

FIG. 4 is a plan view of a liquid crystal display according to another exemplary embodiment, and FIG. 5 is a cross-sectional view taken along line V-V of FIG. 4.

Referring to FIG. 4 and FIG. 5, a liquid crystal display according to the present exemplary embodiment includes a lower display panel 100, e.g. first substrate and an upper display panel 200, e.g. second substrate facing each other, and a liquid crystal layer 3 interposed between the two display panels 100 and 200.

First, the lower display panel 100 will be described.

A plurality of gate lines 121, a plurality of step-down gate lines 123, and a plurality of storage electrode lines 125 are disposed on an insulation substrate 110.

According to an embodiment, a gate line and a step-down gate line may be disposed on the lower display panel, e.g. first substrate, and a data line may intersect the gate line.

The gate lines 121 and the step-down gate lines 123 extend in a mainly transverse direction and transmit a gate signal. The gate line 121 includes a first gate electrode 124a, and a second gate electrode 124b extending in an upward and a downward direction, and the step-down gate line 123 includes a third gate electrode 124c protruding in an upward direction. The first gate electrode 124a and the second gate electrode 124b are connected to each other to form one protrusion.

The storage electrode lines 125 extend in a mainly transverse direction, and transmit a predetermined voltage, such as a common voltage. The storage electrode line 125 includes a storage electrode 129 protruding in an upward and a downward direction, a pair of longitudinal portions 128 extending almost perpendicular to the gate line 121 and in a downward direction, and a transverse portion 127 connecting the ends of a pair of longitudinal portions 128 to each other. The transverse portion 127 includes a storage expansion 126 extended in a downward direction.

A gate insulating layer 140 is disposed on the gate line 121, the step-down gate line 123, and the storage electrode line 125.

A plurality of semiconductor stripes (not shown), wherein each semiconductor stripe includes a hydrogenated amorphous silicon (a-Si), a polysilicon, or the like, are disposed on the gate insulating layer 140. The semiconductor stripes (not shown) extend in a mainly vertical direction, and each semiconductor stripe (not shown) includes a first and a second semiconductor 154a and 154b respectively, extending toward the first and second gate electrodes 124a and 124b respectively, and connected to each other, and a third semiconductor 154c connected to the second semiconductor 154b. The third semiconductor 154c is extended, thereby forming a fourth semiconductor 157.

A plurality of ohmic contact stripes (not shown) are disposed on the semiconductor stripes (not shown), wherein a first ohmic contact (not shown) is disposed on the first semiconductor 154a, and a second ohmic contact 164b and a third ohmic contact (not shown) are disposed on the second semiconductor 154b and the third semiconductor 154c, respectively. The ohmic contact stripes include a first protrusion (not shown) forming a pair along with a first ohmic contact island and disposed on the first protrusion of the semiconductor, a second protrusion (not shown) forming a pair along with a second ohmic contact island and disposed on the second protrusion of the semiconductor, and a third protrusion (not shown) forming a pair along with a third ohmic contact island and disposed on the third protrusion of the semiconductor. The third ohmic contact is extended, thereby forming a fourth ohmic contact 167.

A data conductor including a plurality of data lines 171, a plurality of first drain electrodes 175a, a plurality of second drain electrodes 175b, and a plurality of third drain electrodes 175c, is disposed on each of the ohmic contacts 164b and 167.

The data lines 171 transmit data signals and extend in a longitudinal direction thereby intersecting the gate lines 121 and the step-down gate lines 123. Each data line 171 includes a first source electrode 173a and a second source electrode 173b forming a "W" shape together and extending in a direction towards a first gate electrode 124a and a second gate electrode 124b.

The first drain electrode 175a, the second drain electrode 175b, and the third drain electrode 175c have one end portion having a wide area and the other end portion configured in a linear shape. The bar end portions of the first drain electrode 175a and the second drain electrode 175b are partially enclosed by the first source electrode 173a and the second source electrode 173b. The wide end portion of the second drain electrode 175b is again extended thereby forming a third source electrode 173c configured in a "U" shape. An expansion 177c of the third drain electrode 175c overlaps the storage expansion 126 thereby forming a step-down capacitor ("Cstd"), and a bar end portion is partially enclosed by the third source electrode 173c.

The first, second, and third gate electrodes, 124a, 124b, and 124c, respectively, the first, second, third source electrodes, 173a, 17313, and 173c, respectively, and the first, second, and third drain electrodes, 175a, 175b, and 175c, respectively, form a first, second, and third thin film transistor ("TFT") Qa, Qb, and Qc, respectively, along with the first, second, and third semiconductors 154a, 154b, and 154c. A channel of the first, second, and third thin film transistors is formed in a portion of the first, second, and third semiconductors, 154a, 154b, and 154c, respectively, between the source electrodes 173a, 173b, and 173c, respectively, and the drain electrodes 175a, 175b, and 175c, respectively.

According to an embodiment, a thin film transistor may include a first thin film transistor and a second thin film transistor each connected to the gate line and the data line, and a third thin film transistor connected to the step-down gate line.

According to an embodiment, the gate line may simultaneously transmit a gate signal to at least one control terminal of the first thin film transistor, the second thin film transistor, and the third thin film transistor.

Also, the semiconductor stripes (not shown) including the semiconductors 154a, 154b, and 154c, except for the channel region between the source electrodes 173a, 173b, and 173c and the drain electrodes 175a, 175b, and 175c have substantially the same shape as the data conductors 171, 175a, 175b, and 175c and the ohmic contacts 164b and 167. That is, the semiconductor stripes (not shown) including the semiconductors 154a, 154b, and 154c have a portion that is exposed without being covered by the data conductors 171, 175a, 175b, and 175c, and a portion between the source electrodes 173a, 173b, and 173c and the drain electrodes 175a, 175b, and 175c.

A passivation layer 180 is disposed on the data conductors 171, 175a, 175b, 175c, and the exposed semiconductors 154a, 154b, and 154c.

The passivation layer 180 may include an organic layer and may have a flat surface. The organic layer has negative photosensitivity and a dielectric constant thereby may be less than about 4.0 or less, specifically about 3.0 or less, more specifically about 2.0 or less. The passivation layer 180 may have a dual-layered structure including a lower inorganic layer and an upper organic layer disposed on the exposed region of the semiconductors 154a, 154b, and 154c. While not wishing to be bound by theory, it is believed, the dual-layered structure may facilitate sustaining the inorganic layer's excellent insulating characteristic and not damaging the exposed region of the semiconductors 154a, 154b, and 154c.

The passivation layer 180 includes a plurality of first contact holes 185a and a plurality of second contact holes 185b exposing the wide end of the first drain electrode 175a and the wide end of the second drain electrode 175b.

A plurality of pixel electrodes 191 are disposed on the passivation layer 180.

According to an embodiment, the pixel electrode may include a first subpixel electrode and a second subpixel electrode separated from each other, wherein the first subpixel electrode may be connected to the first thin film transistor, and the second subpixel electrode may be connected to the second thin film transistor. A storage electrode may overlap a terminal of the third thin film transistor, according to an embodiment.

The first subpixel electrode 191a and the second subpixel electrode 191b neighbor each other in a column direction, and are configured in a quadrangular form. The first subpixel and the second subpixel each includes a cross stem, including a transverse stem 192 and a longitudinal stem 193 intersecting the transverse stem. The first and second subpixel electrodes 191a and 191b, are divided into four sub-regions by the transverse stem 192 and the longitudinal stem 193, and each of the sub-regions includes a plurality of minute branches 194. According to an embodiment, the plurality of minute branches may extend from the cross stem.

A first portion of the minute branches 194, of the first subpixel electrode 191a, and the second subpixel electrode 191b, are obliquely extended in a left upper direction, from the transverse stem 192, or the longitudinal stem 193, and a second portion of the minute branches 194, are obliquely extended in a right upper direction, from the transverse stem 192, or the longitudinal stem 193. A third portion of the minute branches 194 are obliquely extended in a left lower direction, from the transverse stem 192, or the longitudinal stem 193, and a forth portion of the minute branches 194, are obliquely extended in a right lower direction, from the transverse stem 192, or the longitudinal stem 193.

Each of the minute branches 194, forms an angle of about 40 degrees to about 45 degrees, with the gate line 121 or the transverse stem 192. The minute branches 194 included in the first subpixel electrode 191a may form an angle of about 40 degrees with the transverse stem 192, and the minute branches 194 included in the second subpixel electrode 191b may form an angle of about 45 degrees with the transverse stem 192. Also, the minute branches 194 of two neighboring sub-regions may be crossed.

The width of the minute branches 194, may be about 3 μm to about 8 μm, specifically about 4 μm to about 7 μm, more specifically about 5 μm to 6 μm. Also, although not shown, the width of the minute branches 194 may be gradually widened.

The first subpixel electrode 191a and the second subpixel electrode 191b include an outer stem enclosing an outer perimeter, and a longitudinal portion of the stem extends in a direction of the data line 171 and prevents capacitive coupling between the data line 171 and the first subpixel electrode 191a and the second subpixel electrode 191b.

The first subpixel electrode 191a and the second subpixel electrode 191b receive the data voltage from the first drain electrode 175a and the second drain electrode 175b through the first contact hole 185a and the second contact hole 185b.

A lower alignment layer 12 is disposed on the pixel electrode 191.

Next, the upper display panel 200 will be described.

A light blocking member 220 is disposed on an insulation substrate 210, wherein the insulation substrate includes a transparent glass or a plastic. The light blocking member 220 reduces or prevents light leakage.

A plurality of color filters 230 are disposed on the substrate 210 and the light blocking member 220. A portion of the color filters 230 are disposed in a region enclosed by the light blocking member 220, and may extend in a direction of a column of the pixel electrode 191. Each color filter 230 may display one of three primary colors such as red, green, and blue. However, it is not limited to the three primary colors red, green, and blue, and may display one of cyan, magenta, yellow, or a white-based color.

At least one of the light blocking member 220 or the color filter 230 may be disposed on the lower substrate 110.

A common electrode 270 is disposed on the color filter 230. An overcoat preventing the color filter 230 from being exposed and providing a flat surface may be disposed between the common electrode 270 and the color filter 230.

An upper alignment layer 22 is disposed on the common electrode 270.

According to an embodiment, when a data voltage is applied to the first subpixel electrode 191a and the second subpixel electrode 191b, the first subpixel electrode 191a and the second subpixel electrode 191b generate an electric field, together with the common electrode 270 of the upper display panel 200, to thereby determine a direction of the liquid crystal molecules of the liquid crystal layer 3 between the two electrodes 191a and 191b, and the common electrode 270. The luminance of light that transmits through the liquid crystal layer 3 differs depending on the thusly-determined direction of the liquid crystal molecules.

According to an embodiment, the first and second subpixel electrodes 191a and 191b respectively, and the common electrode 270, form liquid crystal capacitors, to maintain the applied voltage after the thin film transistor is turned off. An edge of a minute branch 194 forms a horizontal component perpendicular to an edge of a minute branch 194, and an inclination direction of liquid crystal molecules is determined in a direction determined by the horizontal component.

According to an embodiment, the liquid crystal molecules incline in a direction parallel to a length direction of a minute branch 194.

According to an embodiment, the length directions in which the minute branches 194 of one pixel extend are four directions, such that the inclined directions of the liquid crystal molecules are four directions. Therefore, a viewing angle of the liquid crystal display is widened by varying the inclined directions of the liquid crystal molecules.

The first subpixel electrode 191a and common electrode 270 form a first liquid crystal capacitor along with the liquid crystal layer 3 interposed between the first subpixel electrode 191a and the common electrode 270, and the second subpixel electrode 191b and the common electrode 270 form a second liquid crystal capacitor along with the liquid crystal layer 3 interposed between the second subpixel electrode 191b and the common electrode 270, to maintain the applied voltage after the first and second thin film transistors are turned off.

The first and second subpixel electrodes 191a and 191b overlap the storage electrode line 125 as well as the storage electrode 129, thereby forming the first and second storage capacitors, and the first and second storage capacitors enhance the voltage maintaining capacity of the first and second liquid crystal capacitors.

The storage expansion 126 and the expansion 177c of the third drain electrode 175c overlap each other via the gate insulating layer 140 and the semiconductor layers 157 and 167 interposed between, to form a step-down capacitor.

Now, a process of an operation of the liquid crystal display according to the present exemplary embodiment will be described, referring to FIG. 4 and FIG. 5.

The gate line 121 is applied with the first gate signal and the step-down gate line 123 is applied with the second gate signal. If the first gate signal is changed from the gate-off voltage ("Voff") to the gate-on voltage ("Von"), the first and second thin film transistors connected thereto are turned on. Accordingly, the data voltage ("Vd") applied to the data line 171 is applied to the first and second subpixel electrodes 191a and 191b through the turned on first and second thin film transistors. The data voltages ("Vd") applied to the first and second subpixel electrodes 191a and 191b are the same. The first and second liquid crystal capacitors are equally charged by the difference between the common voltage and the data voltage ("Vd").

Next, if the first gate signal is changed from the gate-on voltage ("Von") to the gate-off voltage ("Voff"), and simultaneously the second gate signal is changed from the gate-off voltage ("Voff") to the gate-on voltage ("Von"), the first and second thin film transistors are turned off and the third thin film transistor is turned on. Thus, the charges are moved from the second subpixel electrode 191b to the third drain electrode 175c through the third thin film transistor. Accordingly, the charging voltage of the second liquid crystal capacitor is decreased and the step-down capacitor is charged. The charging voltage of the second liquid crystal capacitor is decreased by the capacitance of the step-down capacitor such that the charging voltage of the second liquid crystal capacitor is lower than the charging voltage of the first liquid crystal capacitor.

Charge voltages of two liquid crystal capacitors Clch and Clcl represent different gamma curves, and the gamma curve of one pixel voltage is a combination curved line of the different gamma curves. The front combination gamma curve coincides with the reference gamma curve at the optimally-determined front side, and the lateral gamma curve approximates the front reference gamma curve. Accordingly, the image data are converted so that the lateral visibility is improved.

According to an embodiment, referring to FIGS. 1 to 3, the lower and upper alignment layers 12 and 22 each include a compound represented by Chemical Formula A.

According to an embodiment, the functional group Y1, represented by Chemical Formula 1, may accelerate a radical reaction of the methacrylate group and the vinyl group. The radical reaction increases the reaction along with a radical residue, wherein the passivation layer 180 includes the organic layer having the negative photosensitivity, wherein the passivation layer includes the radical residue. While not wishing to be bound by theory, it is believed the greenish defect of the organic layer, emitting light of the visible light region may thus be improved.

According to an embodiment, a method of manufacturing a liquid crystal display is provided, including disposing a first substrate, a second substrate facing the first substrate, a thin film transistor disposed on the first substrate, an organic layer disposed on the thin film transistor, a pixel electrode disposed on the organic layer, a lower alignment layer disposed on the pixel electrode, a common electrode disposed on the second substrate, and an upper alignment layer disposed on the common electrode; and contacting at least one of a first free radical included in the organic layer and a second free radical included in at least one of the lower alignment layer and the upper alignment layer to form a product of the first free radical and the second free radical disposed on at least one of the lower alignment layer and the upper alignment layer, to manufacture the liquid crystal display.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a first substrate;
   a second substrate facing the first substrate;
   a thin film transistor disposed on the first substrate;
   an organic layer disposed on the thin film transistor;
   a pixel electrode disposed on the organic layer;
   a lower alignment layer disposed on the pixel electrode;
   a common electrode disposed on the second substrate; and
   an upper alignment layer disposed on the common electrode,
   wherein the liquid crystal display comprises a product of a first free radical included in the organic layer and a second free radical included in at least one of the lower alignment layer and the upper alignment layer at the interface between the organic layer and at least one of the lower alignment layer and the upper alignment layer, wherein the lower alignment layer and the upper alignment layer each further comprises a functional group represented by Chemical Formula 1:

Chemical Formula 1 wherein m is 1-5.

2. The liquid crystal display of claim 1, wherein the lower alignment layer and the upper alignment layer each further comprise a vinyl functional group.

3. The liquid crystal display of claim 2, wherein the lower alignment layer and the upper alignment layer each further comprise a methacrylate functional group.

4. The liquid crystal display of claim 3, wherein the organic layer has negative photosensitivity.

5. The liquid crystal display of claim 4, wherein the pixel electrode comprises a first subpixel electrode and a second subpixel electrode, wherein
the first subpixel electrode and the second subpixel electrode each comprise a cross stem comprising a transverse stem and a longitudinal stem intersecting the transverse stem, and a plurality of branches extending from the cross stem.

6. The liquid crystal display of claim 1, further comprising:
a gate line and a reference voltage line disposed on the first substrate; and
a data line intersecting the gate line.

7. The liquid crystal display of claim 6, wherein the thin film transistor comprises a first thin film transistor and a second thin film transistor each connected to the gate line and the data line, and a third thin film transistor connected to the gate line, a terminal of the second thin film transistor, and the reference voltage line.

8. The liquid crystal display of claim 7, wherein the pixel electrode comprises a first subpixel electrode and a second subpixel electrode separated from each other, wherein
the first subpixel electrode is electrically connected to the first thin film transistor, and the second subpixel electrode is electrically connected to the second thin film transistor.

9. The liquid crystal display of claim 8, further comprising an assistance voltage line electrically connected to the reference voltage line through the third thin film transistor and disposed on the data line,
wherein the assistance voltage line is disposed on a same layer as the pixel electrode.

10. The liquid crystal display of claim 9, wherein the reference voltage line comprises a protrusion overlapping a terminal of the third thin film transistor, and
the assistance voltage line comprises a connecting member extending toward the protrusion of the reference voltage line.

11. The liquid crystal display of claim 8, wherein an output terminal of the second thin film transistor is electrically connected to the second subpixel electrode and an input terminal of the third thin film transistor.

12. The liquid crystal display of claim 11, wherein the first subpixel electrode and the second subpixel electrode comprise a cross stem comprising a transverse stem and a longitudinal stem intersecting the transverse stem, and
a plurality of branches extending from the cross stem.

13. The liquid crystal display of claim 12, wherein each control terminal of the first thin film transistor, the second thin film transistor, and the third thin film transistor is configured to simultaneously respond to a gate signal transmitted on the gate line.

14. The liquid crystal display of claim 1, further comprising
a gate line and a step-down gate line disposed on the first substrate, and
a data line intersecting the gate line.

15. The liquid crystal display of claim 14, wherein the thin film transistor comprises a first thin film transistor and a second thin film transistor each connected to the gate line and the data line, and a third thin film transistor connected to the step-down gate line.

16. The liquid crystal display of claim 15, wherein the pixel electrode comprises a first subpixel electrode and a second subpixel electrode separated from each other, wherein
the first subpixel electrode is electrically connected to the first thin film transistor, and the second subpixel electrode is electrically connected to the second thin film transistor.

17. The liquid crystal display of claim 16, further comprising
a storage electrode overlapping a terminal of the third thin film transistor.

18. The liquid crystal display of claim 1, wherein the first free radical is represented by Chemical Formula 7 or Chemical Formula 8:

Chemical Formula 7

Chemical Formula 8

19. The liquid crystal display of claim 1, wherein the second free radical is represented by Chemical Formula 9:

Chemical Formula 9 wherein Y is —S., Z is (—O—)$_n$, and n is 0 or 1.

* * * * *